United States Patent
Dartois

(10) Patent No.: US 6,922,569 B2
(45) Date of Patent: Jul. 26, 2005

(54) METHOD OF TRANSMITTING CALLS IN A CELLULAR TYPE TELECOMMUNICATIONS SYSTEM USING ADJACENT CARRIER FREQUENCY BANDS

(75) Inventor: Luc Dartois, Carrieres Sous Poissy (FR)

(73) Assignee: Evolium S.A.S., Paris (FR)

( * ) Notice: Subject to any disclaimer, the term of this patent is extended or adjusted under 35 U.S.C. 154(b) by 438 days.

(21) Appl. No.: 10/294,585

(22) Filed: Nov. 15, 2002

(65) Prior Publication Data

US 2003/0096630 A1 May 22, 2003

(30) Foreign Application Priority Data

Nov. 22, 2001 (FR) .............................. 01 15109

(51) Int. Cl.[7] .............................. H04B 7/00; H04Q 7/20
(52) U.S. Cl. .................... 455/522; 455/524; 455/61; 455/63.1; 455/447; 455/20; 370/485; 370/342
(58) Field of Search .................... 455/522, 524, 455/61, 62, 60, 63.1, 63.2, 63.3, 447, 20, 23, 42, 703; 370/206, 335, 445, 482, 485, 209, 480, 342

(56) References Cited

U.S. PATENT DOCUMENTS

| | | | |
|---|---|---|---|
| 4,052,571 A | * 10/1977 | Gregory et al. | 381/321 |
| 4,357,626 A | * 11/1982 | Romeas | 386/96 |
| 6,236,864 B1 | 5/2001 | McGowan et al. | |
| 6,515,961 B1 | * 2/2003 | Weaver et al. | 370/206 |
| 6,687,238 B1 | * 2/2004 | Soong et al. | 370/335 |
| 2001/0055320 A1 | * 12/2001 | Pierzga et al. | 370/480 |

FOREIGN PATENT DOCUMENTS

| | | |
|---|---|---|
| WO | WO 0054426 | 9/2000 |
| WO | WO 0054428 | 9/2000 |

* cited by examiner

Primary Examiner—Nick Corsaro
Assistant Examiner—Shaima Q Aminzay
(74) Attorney, Agent, or Firm—Sughrue Mion, PLLC

(57) ABSTRACT

The invention relates to a method of transmitting calls in a cellular type telecommunications system using a plurality adjacent carrier frequency bands and in which a first cell or a first site uses only a fraction of said frequency bands, the transmitted signals being subjected to peak clipping prior to application to an amplifier of a transmitter system in order to optimize the efficiency of the amplifier. Prior to being applied to the input of the amplifier, the signals (32) to be transmitted for the first cell (or first site) are subjected to filtering (28) so that the power density of the peak-clipping noise is not eliminated in adjacent frequency bands ($f_2$, $f_3$) that are unused by said first cell.

13 Claims, 1 Drawing Sheet

METHOD OF TRANSMITTING CALLS IN A CELLULAR TYPE TELECOMMUNICATIONS SYSTEM USING ADJACENT CARRIER FREQUENCY BANDS

The invention relates to a method of transmitting calls in a cellular type telecommunications system using adjacent carrier frequency bands.

The invention also relates to a transmitter having a power amplifier for a cellular type telecommunications system, which transmitter has a plurality of adjacent frequency bands allocated thereto. The invention relates more particularly, but not exclusively, to a telecommunications system in which calls are made to differ from one another by means of orthogonal codes.

BACKGROUND OF THE INVENTION

In a cellular type telecommunications system, it is known that terminal calls occupying a cell or a site are relayed by means of a base station. In accordance with the UMTS standard, the term "cell" is used to designate a geographical zone having a single carrier frequency band allocated thereto, while the term "site" designates a geographical zone having a plurality of carrier frequency bands and/or a plurality of sectors, generally adjacent bands and/or sectors allocated thereto. In which case, it is the general practice to use a single power amplifier for all of the carrier frequencies of a sector, with the amplifier then being referred to as a "multicarrier amplifier". More generally, in order to minimize the number of kinds of equipment that need to be produced, it is preferable to use a transmitter of the same type (same power class), and a power amplifier of the same type in all of the sectors of all sites.

A power amplifier of that type must satisfy a certain number of contradictory requirements; in particular, the amplifier must conserve its properties of linearity over a broad range while nevertheless providing high energy efficiency.

A power amplifier for transmitting a plurality of adjacent carrier frequencies presents a high peak-to-average power ratio (PAR). The higher this ratio the lower the efficiency of the amplifier. To remedy that drawback, it is known to limit the peak power of the combined signal before applying it to the input of the amplifier. However such peak clipping spoils the signal and gives rise to distortion in the band under consideration, and also outside said band(s). To comply with standards concerning out-of-band pollution, the peak clipping is therefore limited, i.e. the increase in efficiency that can be obtained using that technique is limited.

Because of those various constraints, it is not generally possible to use the same type of power amplifier system, i.e. the same transmitter, for an extensive site having relatively low subscriber density such as a cell in a rural zone with a single frequency band, and for one or more sites having significantly higher densities of users, commonly using a plurality of adjacent frequency bands.

In particular, if an operator seeks to use a single type of transmission equipment for a "rural" cell with a single frequency band and for one or more "urban" sites having N, e.g. 3, adjacent frequency bands, even if an efficient peak-clipping method is used, the transmission power for the rural cell is restricted to N times the power per carrier for the other sites. Because of the attenuation factor due to propagation, which is about 2.5, if the operator seeks to provide a high speed data service in a rural cell with a single frequency band, the radius of said rural cell is less than twice the radius of a high-traffic urban cell.

OBJECTS AND SUMMARY OF THE INVENTION

The invention makes it possible to increase the radius of rural cells (or sites). It is based on the observation that standards, and in particular the UMTS/CDMA standard, impose spectral constraints for the effects of one band on another which can sometimes turn out to be excessive when seeking to guarantee proper quality of service and high capacity.

Thus, the invention relates to a method of peak clipping a signal on a power amplifier, which method is characterized in that the peak clipping of one or more working carriers is spread over one or more unused adjacent carriers. For example, in a rural cell using a single carrier frequency band, peak clipping is increased, i.e. peak power is decreased by "polluting" the adjacent frequency bands, with this pollution nevertheless remaining limited so that the quality of the signals transmitted by neighboring cells or sites, e.g. using a power amplifier of the same type, remains unaffected.

The method makes it possible to achieve a power gain of about 2 decibels (dB) for a rural cell. This makes it possible to increase the radius of the cell and/or to increase the number of its subscribers. An increase of 2 dB corresponds, for example, to increasing power from 30 watts (W) to 47 W. This makes it possible to give a rural cell a level of power which is greater than the sum of the powers allocated to all of the neighboring sites.

In the invention, the efficiency of an amplifier rises to a value of about 25%, compared with a value of about 15% without the invention.

In an embodiment of the invention, for the cell using a single frequency band, the selected frequency band is located substantially in the middle of the band of frequencies available to the operator concerned. Nevertheless, the invention is not limited to the case of a cell using a single band. It is also possible for a site to use two bands and for one or two adjacent bands to be called on to contribute to the peak clipping of the working bands.

Thus, in general manner, the invention provides a method of transmitting calls in a cellular type telecommunications system using a plurality adjacent carrier frequency bands and in which a first cell or a first site uses only a fraction of said frequency bands, the transmitted signals being subjected to peak clipping prior to application to an amplifier of a transmitter system in order to optimize the efficiency of the amplifier. This method is characterized in that the signals to be transmitted for the first cell (or first site) are subjected prior to being applied to the input of the amplifier to filtering so that the power density of the peak-clipping noise in the adjacent frequency bands that are not used by said first cell is not eliminated.

In an implementation, the power density of the peak-clipping noise in the adjacent frequency band(s) is power limited so as to avoid giving rise to a measurable contribution to interference in the adjacent frequencies used by the neighboring sites.

The filtering of the working frequency band(s) of the first cell (or first site) may present the same attenuation as the filtering for the other frequency band(s).

In a variant, the filtering for the working frequency band(s) of the first cell (or of the first site) presents attenuation which is greater than the attenuation applied to the other frequency band(s).

In an implementation, the filtering is such that the spectral contribution of the distortion due to the peak clipping is less in the working frequency band(s) of the first cell (or the first site) than in the adjacent frequency band(s).

Preferably, the filtering in the bands adjacent to the working frequency band(s) of the first cell (or the first site) is selected so as to create interference in neighboring sites or cells which is at a level lower than the interference created in said neighboring sites or cells themselves.

In an implementation, each call is allocated to a code selected from a set of orthogonal codes.

In a preferred implementation, the first cell (or the first site) has allocated thereto a frequency band or a set of frequency bands lying in the middle of a group of frequency bands used by the neighboring cells or sites.

The first cell (or first site) may have conferred thereon transmission power which is greater than the sum of the transmission powers in the neighboring sites or cells.

In which case, it is advantageous for the amplifier to be used for the transmitter system in the first cell (or first site) and the amplifiers used for the transmitter systems in the neighboring sites or cells all to be of the multicarrier type and all to have the same characteristics, with the exception of power margins, the power margin of the amplifier of the first cell (first site) being smaller than the power margin of the amplifiers for the neighboring sites.

The invention also provides a transmitter having a power amplifier for a cellular telecommunications system using a plurality of different carrier frequency bands, said transmitter being for use in a cell (or a site) where the number of frequency bands allocated is lower than the total number of frequency bands available for the system, said transmitter being provided with signal peak-clipping means upstream from an amplifier so as to optimize the efficiency of the amplifier. The transmitter is characterized in that it uses a filter characteristic which performs peak clipping in the carrier frequency band(s) used by the cell (or the site) and in the other carrier band(s) of the telecommunications system, the spectral power contribution due to said peak clipping being non-zero for said other carrier band(s).

In an embodiment, the filter characteristic applies the same peak-clipping power in the working frequency band(s) as in the other band(s).

In a variant, the filter characteristic is such that attenuation is greater in the working frequency band(s) of the first cell than in the other band(s).

BRIEF DESCRIPTION OF THE DRAWINGS

Other characteristics and advantages of the invention appear from the following description of various implementations given with reference to the accompanying drawing, in which.

MORE DETAILED DESCRIPTION

The implementation described below with reference to the figures relates to a cellular type telecommunications system for mobile terminals in compliance with the UMTS/CDMA standard. In this example, a base station is used for each site, and the base station of each site comprises a single transmitter and a single power amplifier for a plurality of cells (it being recalled that in the UMTS standard, a "cell" corresponds to a single frequency band only).

In accordance with the standard, each operator has three or four frequency bands at most, each band occupying 5 MHz, and calls transmitted by a base station to mobile stations have respective codes allocated thereto. The various codes transmitted simultaneously by the base station on the same frequency to the mobile stations are mutually orthogonal so that each mobile station receives only the call which is being sent thereto, by means of the mobile station multiplying the codes it receives by said code. The product of two identical codes is equal to 1, whereas the product of two different codes that are mutually orthogonal is zero.

Figure 1:
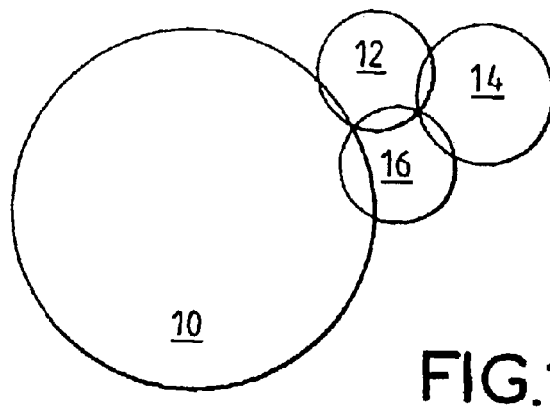
FIG. 1 shows a rural type cell together with three high-traffic sites in a telecommunications system.

The invention seeks above all to solve the problem shown in FIG. 1 of a base station transmitting in a low-traffic cell 10 of relatively large extent for which the operator uses only one of the frequency bands allocated thereto (or a small number of the allocated frequency bands), whereas the operator also transmits in adjacent high-traffic sites of smaller dimensions 12, 14, and 16. Each of these sites 12, 14, and 16 have all of the frequency bands of the operator allocated thereto, i.e. all three in the present example. These frequency bands are adjacent and cover the central frequency band of the low-datarate cell 10.

Figure 2:
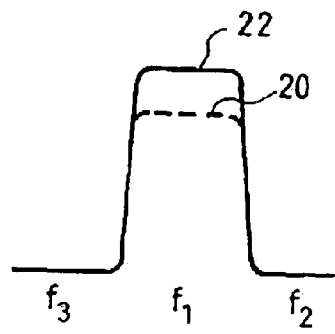
FIG. 2 is a diagram showing the peak clipping performed in the frequency domain in the rural type cell by means of the known peak clipping method.

In such a situation, until now, in order to optimize the efficiency of the power amplifier of the radio transmitter at the base station of the rural cell 10, the signals allocated to said frequency band $f_1$ (FIG. 2) have been peak clipped by applying a spectrum filter characteristic to the signal for transmitting by the cell 10 prior to amplifying them, so that the power in the working band $f_1$ of the cell 10 is limited to a maximum 20 that is below the maximum 22 obtained without peak clipping, and other frequencies, and in particular the adjacent frequencies $f_2$ and $f_3$ are eliminated. Thus, the interfering signals that result from the peak clipping are completely eliminated.

The neighboring cells (adjacent frequencies) therefore receive no interfering signal.

Figure 3:
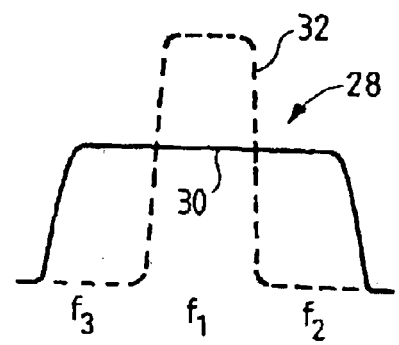
FIGS. 3, 4, and 5 are diagrams analogous to that of FIG. 2, showing three implementations of the method of the invention.

In the example of the invention shown in FIG. 3, a filter characteristic 28 is used for the signals 32 of the cell 100 which does not eliminate the adjacent frequency bands $f_2$ and $f_3$. Under such conditions, it is possible to lower the peak threshold applied to the working signals in the band $f_1$ since distortion is shared over all three bands. In this example, the filter presents a maximum 30 which is the same for all three adjacent frequency bands $f_1$, $f_2$, and $f_3$.

Such a filter characteristic must nevertheless be selected in such a manner as to minimize the disturbing effects on neighboring sites using the same frequencies $f_1$, $f_2$, or $f_3$. The filter characteristic is selected in such a manner that the interference produced at the edge of the cell, i.e. its boundaries with neighboring sites, remains below the interference generated within these neighboring sites and cells. This avoids harming the capacity of said urban sites or cells.

In any event, transmissions between neighboring cells or sites differ because they use different encryption codes.

Figure 4:
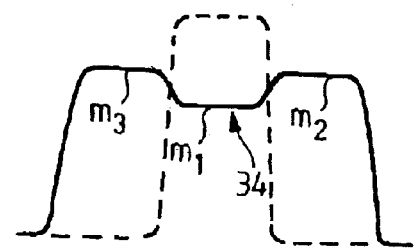

In the example used in FIG. 4, a filter characteristic 34 is used presenting a maximum $m_1$ in the working band $f_1$ for the cell 10 which is lower than the maxima $m_2$ and $m_3$ of the same filter characteristic in the adjacent bands $f_2$ and $f_3$. Under such circumstances, as in the example described with reference to FIG. 3, the noise due to the peak clipping is thus concentrated in the adjacent bands $f_2$ and $f_3$ which are not used by the cell 10. As in the example of FIG. 3, the filter characteristic is selected so at the margins, for neighboring sites using the same frequency bands from the same operator, interference is lower in said neighboring sites than the interference created within the sites themselves.

Figure 5:
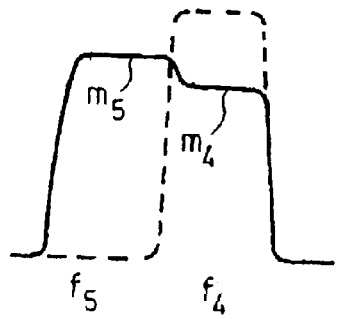

Naturally, the invention is not limited to an operator having three adjacent frequency bands, with the central band being used for a low-traffic cell. Thus, as shown in FIG. 5, an operator having two frequency bands and using a frequency band $f_4$ for the rural cell can provide a filter characteristic adapted to said situation, i.e. for the frequency band $f_4$, a filter maximum at a level $m_4$, and for the adjacent band $f_5$, filtering having a maximum $m_5$ which is greater than the maximum $m_4$.

Whatever the way in which it is implemented, the invention makes it possible for the transmitter system in a cell 10 to use a carrier amplifier of the same type, i.e. having the same characteristics, as the amplifiers used in the transmitter systems for the neighboring sites 12, 14, and 16.

Nevertheless, the power margin of the amplifier of the cell 10 is lower than the power margin of the amplifiers for the neighboring sites. Under such conditions, its efficiency is higher. It is thus possible to provide for the rural cell 10 to transmit at a power that is higher than the sum of the transmission powers for the neighboring sites.

The reduction in the PAR (peak to average ratio) or of the power margin enable the digital predistortion signals which are generally used for linearizing power amplifiers to converge rapidly. This makes operation more stable.

What is claimed is:

1. A method of transmitting calls in a cellular type telecommunications system using a plurality adjacent carrier frequency bands and in which a first cell or a first site (10) uses only a fraction of said frequency bands, the transmitted signals being subjected to peak clipping prior to application to an amplifier of a transmitter system in order to optimize the efficiency of the amplifier, the method being characterized in that the signals (32) to be transmitted for the first cell (or first site) are subjected prior to being applied to the input of the amplifier to filtering (28; 34; $m_4$, $m_5$) so that the power density of the peak-clipping noise in the adjacent frequency bands that are not used by said first cell is not eliminated.

2. A method according to claim 1, characterized in that the power density of the peak-clipping noise in the adjacent frequency band(s) is power limited so as to avoid giving rise to a measurable contribution to interference in the adjacent frequencies used by the neighboring sites.

3. A method according to claim 1, characterized in that the filtering of the working frequency band(s) of the first cell (or first site) presents the same attenuation as the filtering for the other frequency band(s).

4. A method according to claim 1, characterized in that the filtering for the working frequency band(s) of the first cell (or of the first site) presents attenuation which is greater than the attenuation applied to the other frequency band(s).

5. A method according to claim 1, characterized in that the filtering is such that the spectral contribution of the distortion due to the peak clipping is less in the working frequency band(s) of the first cell (or the first site) than in the adjacent frequency band(s).

6. A method according to claim 1, characterized in that the filtering in the bands adjacent to the working band(s) of the first cell (or the first site) is selected so as to create interference in neighboring sites or cells which is at a level lower than the interference created in said neighboring sites or cells themselves.

7. A method according to claim 1, characterized in that each call is allocated to a code selected from a set of orthogonal codes.

8. A method according to claim 1, characterized in that the first cell (or the first site) has allocated thereto a frequency band or a set of frequency bands lying in the middle of a group of frequency bands used by the neighboring cells or sites.

9. A method according to claim 1, characterized in that the transmission power in the first cell (or the first site) is greater than the sum of the transmission powers in the neighboring sites or cells.

10. A method according to claim 9, characterized in that the amplifier used for the transmitter system in the first cell (or first site) and the amplifiers used for the transmitter systems in the neighboring sites or cells are all of the multicarrier type and all have the same characteristics, with the exception of power margins, the power margin of the amplifier of the first cell (first site) being smaller than the power margin of the amplifiers for the neighboring sites.

11. A transmitter having a power amplifier for a cellular telecommunications system using a plurality of different carrier frequency bands, said transmitter being for use in a cell (10) (or a site) where the number of frequency bands allocated is lower than the total number of frequency bands available for the system, said transmitter being provided with signal peak-clipping means upstream from an amplifier so as to optimize the efficiency of the amplifier, the transmitter being characterized in that it uses a filter characteristic which performs peak clipping in the carrier frequency band(s) used by the cell (or the site) and in the other carrier band(s) of the telecommunications system, the spectral power contribution due to said peak clipping being non-zero for said other carrier band(s).

12. A transmitter according to claim 11, characterized in that the filter characteristic applies the same peak-clipping power in the working frequency band(s) as in the other band(s).

13. A transmitter according to claim 11, characterized in that the filter characteristic is such that attenuation is greater in the working frequency band(s) of the first cell than in the other band(s).

* * * * *